March 10, 1970  H. STRAUCH  3,500,271

PRESSURE TRANSDUCERS

Filed Jan. 12, 1968  2 Sheets-Sheet 1

Inventor
HEINRICH STRAUCH
By
Holcombe, Wetherill & Brisebois
Attorneys

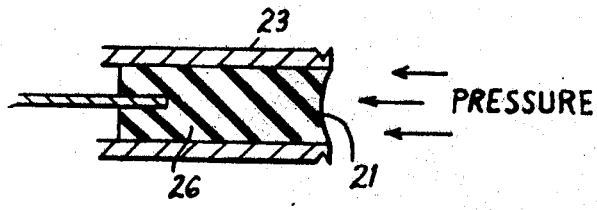
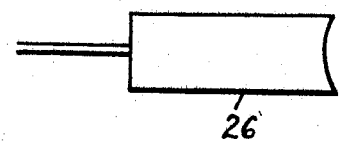
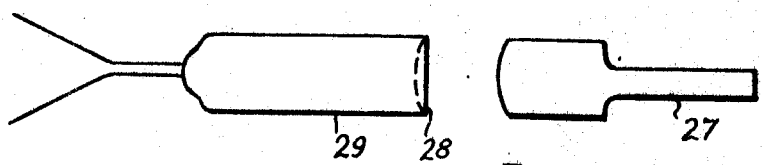
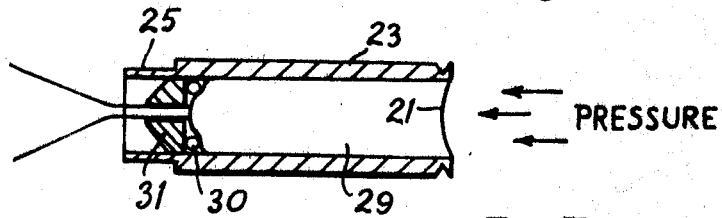
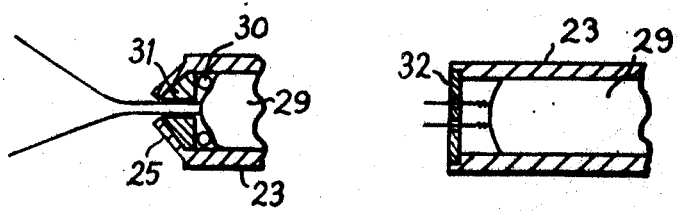
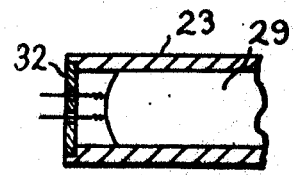

3,500,271
       PRESSURE TRANSDUCERS
Heinrich Strauch, Leamington Spa, England, assignor to
  Associated Engineering Limited, Leamington Spa, England, a British company
       Filed Jan. 12, 1968, Ser. No. 697,434
Claims priority, application Great Britain, Jan. 20, 1967,
                  3,091/67
       Int. Cl. H01f 21/02, 27/02; G01l 9/00
U.S. Cl. 336—30                                  5 Claims

ABSTRACT OF THE DISCLOSURE

This invention provides a pressure transducer which produces variations in an electrical output signal in response to variations in applied pressure and of the type in which a pressure sensitive diaphragm is spaced from the active face of the transducer. According to the invention, the active face is shaped so as to be contacted by the diaphragm without rupture of the diaphragm, when said diaphragm is loaded by a pressure in excess of the maximum working pressure at which the transducer is intended to be used.

---

The present invention relates to improvements in pressure transducers and more particularly to transducers which produce variations in an electrical output signal in response to variations in applied pressure.

As at present constructed such transducers, which are often required to be of miniature or sub-miniature form, comprise a diaphragm which is spaced by a small distance from the active face of the transducer. This face is generally a flat area and with such a construction, if a high pressure overload is applied to the diaphragm, it is urged strongly into contact with the flat active face of the transducer which impedes the bowing or further deflection of the diaphragm over part of its area, whereby the diaphragm becomes ruptured, generally around its circumference.

It is an object of the present invention to provide an improved construction of pressure transducer wherein the risk of rupture of the diaphragm under pressure overload conditions is substantially reduced.

The invention provides a pressure transducer of the type in which a pressure sensitive diaphragm is spaced from the active face of the transducer, wherein said active face is shaped so as to be contacted by the diaphragm without rupture of the diaphragm, when said diaphragm is loaded by a pressure in excess of the maximum pressure at which the transducer is intended to be used.

Preferably the active face is so shaped and spaced from the diaphragm that the diaphragm does not contact the active face until the diaphragm is loaded by a predetermined pressure in excess of the intended maximum working pressure.

The active face may be curved so as substantially to correspond to the shape assumed by the diaphragm when loaded to or slightly beyond the maximum pressure at which the transducer is intended to be used. With such a construction, when the maximum load or an excess pressure load is applied to the diaphragm, it is urged into contact with the contoured active face of the transducer over a large part of its area and thus is sufficiently firmly supported that it can withstand a pressure overload without causing rupturing of the diaphragm.

According to one embodiment of the invention, the transducer is enclosed within a holder including a portion made of a non-ferromagnetic material and which forms the active face of the transducer, said portion being shaped in accordance with the invention and covered by the diaphragm. This active face portion may be an integral part of the holder or may be a separate part attached to the remainder of the holder.

According to a further embodiment of the invention, the shaped active face may be a part of the transducer independent of any enclosure for the transducer, said part being covered by the diaphragm.

The invention also provides a method of making such transducers which comprises the steps of mounting the diaphragm on a holder for the transducer, deflecting the diaphragm under a pressure load equivalent to or slightly beyond the maximum pressure under which the transducer will be used and whilst deflected forming a pattern against that face of the diaphragm which is to lie against the active face of the transducer, removing the pattern and machining or otherwise shaping the active face of the transducer to correspond to the pattern, inserting the transducer into the holder whilst the diaphragm is again deflected under said pressure, until the contoured active face of the transducer contacts the diaphragm, securing the transducer in position in the holder and removing the pressure load from the diaphragm. Sealing means are provided between the transducer and the holder in order to prevent leakage from atmospheric pressure to the lower pressure under the diaphragm.

In order to produce an absolute pressure transducer, the space between the diaphragm and the active face of the transducer is evacuated.

The transducer is preferably of the inductive type and may be advantageously constructed in the manner described in our Patent No. 3,350,670. The aforementioned patent discloses an inductive transducer or probe comprising a core consisting of a bundle of wires, at least one coil extending around said core, and part of the length of the wires of the core being bent back over the outer surface of the coil.

The invention will now be further described, by way of example, with reference to the accompanying drawings, in which:

FIGURES 3 to 9 illustrate different steps in the manufacture of a further embodiment of inductive pressure transducer according to this invention.

Figure 1:
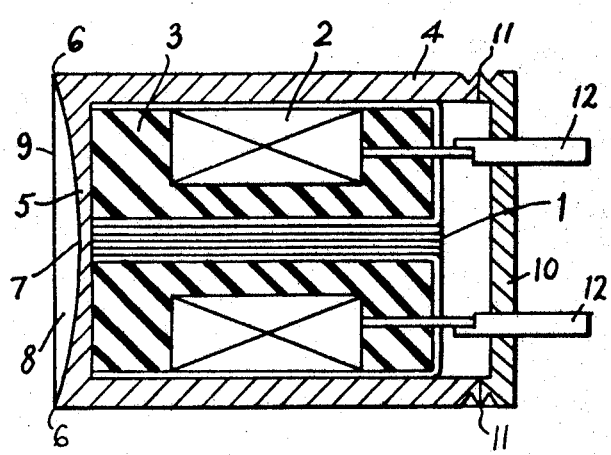
FIGURE 1, is a cross-sectional view through one embodiment of inductive pressure transducer according to the invention.

Referring to FIGURE 1 the inductive pressure transducer shown is constructed generally in the manner described in the aforementioned Patent No. 3,350,670, and comprises a bundle of iron wires 1 around which is disposed a coil 2 wound on a ceramic coil former 3. The coil is wound with an insulated wire and a portion of the wires 1 of the core is bent back over the outer surface of the coil so that the opposite ends of the wires are substantially coplaner. The transducer end face may be machined back to achieve the desired sensitivity, as described in the aforementioned patent. The transducer is fitted into a tubular holder 4 including an end portion 5 forming the active face of the transducer, so that the front face of the transducer is virtually completely in contact with the rear of the end portion of the holder. The transducer is secured in position by means of an adhesive such as "Araldite." The holder with its integral end portion is made of a non-ferromagnetic material, such as non-magnetic stainless steel, aluminum, brass or copper or it could be made of an electrical insulating material, such as a synthetic plastics material.

The front 7 of the end portion is shaped to a curve e.g. by machining, to define a cavity 8 between the active face of the transducer and a diaphragm 9 of magnetic material which is secured at the periphery 6 of the cavity e.g. by electron beam welding. This process is carried out under vacuum so that the cavity 8 is evacuated whereby the transducer formed is an absolute pressure transducer.

The rear end of the holder is sealed by an end plate 10 which is electron beam welded to the holder at 11. Terminal connectors 12 extend through the end plate and are connected to the ends of the wires from the coil 2.

The active face 7 is so shaped and spaced from the diaphragm 9 that the diaphragm does not contact the active face until the diaphragm is loaded by a predetermined pressure in excess of the intended maximum working pressure for the transducer. Furthermore the curved shape of the active face enables the diaphragm to contact the active face, when loaded by an excess pressure, without rupture of the diaphragm.

Figure 2:
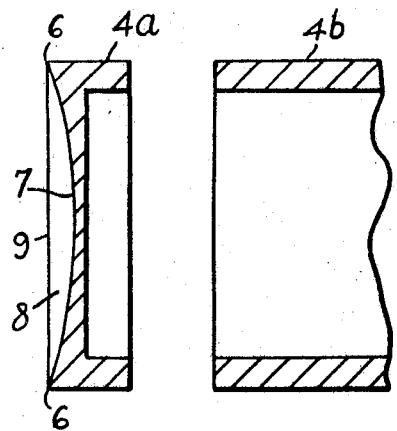
FIGURE 2, is a fragmentary view of a modification to the holder.

FIGURE 2 shows a modification to the holder wherein the front end portion 4a including the contoured active face 7 covered by the diaphragm 9 is made as a separate part from the main tubular body 4b of the holder. The two parts are subsequently secured together e.g. by electron beam welding. Only the portion 4a need be made of a non-ferromagnetic material. This construction allows the portion 4a to be made as a standard part which can be assembled to different types of main body 4b, since the precise form of the latter may be varied according to the location in which the transducer is to be used. Thus the external surface of the main body made carry a screw thread so that it can be threaded into a correspondingly threaded cavity.

Figure 3:
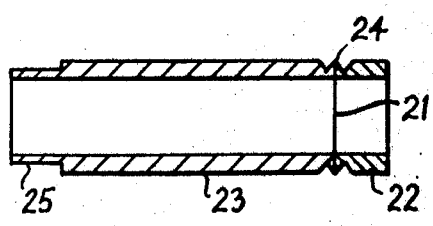

Referring now to the embodiment of FIGURES 3 to 9, in FIGURE 3, there is shown a metal holder 23 for a pressure transducer, having a front piece 22 and diaphragm 21. Diaphragm 21 is clamped between parts 22 and 23 and electron-beam welded around its circumference 24. The part 22 is machined off after the welding operation is completed. As indicated in FIGURE 4 the transducer holder 23 is fitted in a pressure line and the diaphragm 21 is loaded to or slightly beyond the maximum pressure at which the transducer is intended to be used, so that the diaphragm is deflected. The transducer holder is now filled with a moulding material 26 which contacts the rear of the deflected diaphragm. After setting, the mould is withdrawn and its face is a replica of the deflected diaphragm. A grinding tool 27 is made which fits into the concave surface of the moulded replica 26 (FIGURE 5). This grinding tool 27 is now used to machine the active face of the inductive transducer 29 so that its active face 28 has the same curvature as the diaphragm deflected under the chosen pressure (FIGURE 6). The transducer may be constructed as described in Patent 3,350,670.

The holder 23 is again fitted in a pressure line and the maximum pressure applied to the diaphragm (FIGURE 7. The transducer 29 is pushed from the rear end into the holder and located in position with a sealing material such as "Araldite" or a ceramic, so that the transducer is substantially completely in contact with the diaphragm. When the sealing material is completely set, the pressure transducer is taken out of the pressure line. An O-ring 30 is inserted behind the transducer and held in position by a metal member 31. The thinner rear end 25 of the transducer holder 3 is rolled over member 31 to hold it in place (FIGURE 8).

Because of slight imperfections in the grinding of the transducer active face and in the fixing of the transducer in the transducer holder under atmospheric pressure, this type of pressure transducer is not an absolute pressure transducer because of air trapped between the diaphragm and the active face. The sealing ring 30 prevents leakage from atmospheric pressure to the lower pressure under the diaphragm.

In order to produce an absolute pressure transducer, instead of the sealing ring 30 and member 31, a vacuum-sealed termination cap 32 is electron-beam welded under vacuum on to the rear end of the transducer holder (FIGURE 9).

In the embodiment of FIGURE 1, the rear end of the holder 4 may be terminated by an arrangement similar to that shown at 25, 30 and 31 in FIGURE 8, instead of providing the welded end plate 10.

I claim:
1. An inductive pressure transducer comprising a magnetic core, at least one coil extending around said core, a holder enclosing said coil and core assembly, said holder including a portion made of non-ferromagnetic material which forms the active face of said transducer and which entirely covers that portion of said coil and core assembly adjacent said active face, a pressure sensitive diaphragm having its edge supported by a part of said holder and covering and spaced from said active face so as to define an enclosed space between said diaphragm and said active face, and said active face being so shaped as to be contacted by said diaphragm without rupture of the diaphragm, when said diaphragm is loaded by a pressure in excess of the maximum pressure at which said transducer is intended to be used.

2. A transducer as claimed in claim 1, wherein the active face is curved so as substantially to correspond to the shape assumed by the diaphragm when loaded to or slightly beyond the maximum pressure at which the transducer is intended to be used.

3. A transducer as claimed in claim 1 wherein the transducer is of the inductive type comprising a core consisting of a bundle of wires, at least one coil extending around said core, and part of the length of the wires of the core being bent back over the outer surface of the coil so that the opposite ends of the wires are substantially coplanar, and the diaphragm is made of ferromagnetic material.

4. A transducer as claimed in claim 1, wherein the space between the diaphragm and the active face of the transducer is evacuated whereby the transducer forms an absolute pressure transducer.

5. An inductive pressure transducer comprising a core consisting of a bundle of wires, at least one coil extending around said core, and part of the length of the wires of the core being bent back over the outer surface of the coil so that the opposite ends of the wires are substantially coplanar, a holder enclosing the transducer, said holder including a portion made of non-ferromagnetic material which forms the active face of the transducer and which entirely covers that portion of said coil and core assembly adjacent said active face, the inner surface of said active face contacting the ends of said wires, the outer surface of said active face being curved, a diaphragm of ferromagnetic material spaced from and covering the outer surface of said active face to define an enclosed spaced between said diaphragm and said active face, and the curvature of said outer surface substantially correspondingly to the shape assumed by the diaphragm when loaded to a pressure in excess of the intended maximum working pressure for the transducer.

References Cited
UNITED STATES PATENTS

| 619,760 | 2/1899 | Kinraide | 336—234 XR |
| 2,583,941 | 1/1952 | Gordon | 336—30 |
| 2,641,742 | 6/1953 | Wolfe et al. | 336—30 |
| 2,999,385 | 9/1961 | Wolfe | 73—407 XR |
| 3,350,670 | 10/1967 | Strauch | 336—90 |

FOREIGN PATENTS 260,731  1926  Great Britain.

THOMAS J. KOZMA, Primary Examiner

U.S. Cl. X.R.

29—602; 73—398. 406; 336—90